United States Patent
Takahashi

(10) Patent No.: US 12,092,608 B2
(45) Date of Patent: Sep. 17, 2024

(54) ION ANALYSIS DEVICE

(71) Applicant: SHIMADZU CORPORATION, Kyoto (JP)

(72) Inventor: Hidenori Takahashi, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 307 days.

(21) Appl. No.: 17/792,170

(22) PCT Filed: Mar. 12, 2020

(86) PCT No.: PCT/JP2020/010915
§ 371 (c)(1),
(2) Date: Jul. 12, 2022

(87) PCT Pub. No.: WO2021/181628
PCT Pub. Date: Sep. 16, 2021

(65) Prior Publication Data
US 2023/0048972 A1 Feb. 16, 2023

(51) Int. Cl.
*H01J 49/14* (2006.01)
*G01N 27/623* (2021.01)
*G01N 27/626* (2021.01)

(52) U.S. Cl.
CPC ......... *G01N 27/623* (2021.01); *G01N 27/626* (2013.01); *H01J 49/14* (2013.01)

(58) Field of Classification Search
CPC ..... G01N 27/623; G01N 27/626; H01J 49/14; H01J 49/0045
USPC ........................................ 250/281, 282, 288
See application file for complete search history.

(56) References Cited

U.S. PATENT DOCUMENTS

| 2019/0088459 A1* | 3/2019 | Takahashi | ........... H01J 49/0072 |
| 2020/0111654 A1 | 4/2020 | Takahashi et al. | |
| 2021/0050198 A1 | 2/2021 | Takahashi | |

FOREIGN PATENT DOCUMENTS

| WO | 2018/186286 A1 | 10/2018 |
| WO | 2019/155725 A1 | 8/2019 |

OTHER PUBLICATIONS

Chinese Office Action dated Apr. 12, 2024 in Application No. 202080090550.0.

(Continued)

*Primary Examiner* — Michael Maskell
(74) *Attorney, Agent, or Firm* — Sughrue Mion, PLLC

(57) ABSTRACT

An ion analysis device 1 configured to generate and analyze product ions from precursor ions derived from a sample component includes: a reaction chamber 132 into which the precursor ions are introduced; a radical emitter 134 made of a predetermined kind of metal and disposed in the reaction chamber or a space communicating with the reaction chamber, at least a part of a surface of the radical emitter being oxidized or nitrided; a heating unit 20 configured to heat the radical emitter to a predetermined temperature; and separation detection units 135 and 136 configured to separate and detect, according to at least one of a mass-to-charge ratio and an ion mobility, product ions generated from the precursor ions by a reaction with radicals emitted from the radical emitter heated to the predetermined temperature.

10 Claims, 4 Drawing Sheets

(56) References Cited

OTHER PUBLICATIONS

Yoshio Hirano, "Release of atomic oxygen in thermal decomposition of metal oxide", Journal of Japanese Science, 1961, pp. 152-155, vol. 82, No. 2.
Written Opinion of PCT/JP2020/010915 dated Jul. 28, 2020 [PCT/ISA/237].
International Search Report of PCT/JP2020/010915 dated Jul. 28, 2020 [PCT/ISA/210].
Notice of Allowance dated May 30, 2023 from the Japanese Patent Office in Application No. 2022-505664.

* cited by examiner

ION ANALYSIS DEVICE

CROSS REFERENCE TO RELATED APPLICATIONS

This application is a National Stage of International Application No. PCT/JP2020/010915 filed on Mar. 12, 2020.

TECHNICAL FIELD

The present invention relates to an ion analysis device which dissociates ions derived from sample molecules by irradiating the ions with radicals to generate and analyze product ions.

BACKGROUND ART

When structural analysis of a protein or peptide, which is a macromolecular compound, is performed, it is effective to dissociate the protein or peptide at a specific site and estimate the partial structure of the protein or peptide from ions generated by the dissociation.

Patent Literature 1 describes an ion analysis device which generates and analyzes product ions by irradiating precursor ions derived from sample molecules, which are proteins and peptides, with radicals. In this ion analysis device, while a raw material gas is supplied to an evacuated radical generation chamber, the raw material gas is turned into plasma by radio-frequency discharge to generate radicals. Then, the radicals generated in the radical generation chamber are introduced into an ion trap which has trapped precursor ions derived from a sample component, and the precursor ions are dissociated by reaction with the radicals to generate product ions. Patent Literature 1 discloses that oxygen radicals generated by using water vapor or air as a raw material gas can be used to generate an a-ion or a y-ion from a peptide-derived ion. In addition, it is shown that a-ion, b-ion, x-ion, and y-ion can be generated from peptide-derived ions using nitrogen radicals generated by using nitrogen gas as a raw material gas.

CITATION LIST

Patent Literature

Patent Literature 1: WO 2018/186286 A
Patent Literature 2: WO 2019/155725 A

Non Patent Literature

Non Patent Literature 1: Yoshio Harano, "Release of atomic oxygen in thermal decomposition of metal oxide", Journal of Japanese Science, Vol. 82, No. 2 (1961), pp. 152-155

SUMMARY OF INVENTION

Technical Problem

In the ion analysis device of Patent Literature 1, plasma is generated by supplying radio-frequency power having a high output of 50 W, and radicals are generated from the raw material gas. The mass spectrometer includes a radio-frequency power source for supplying radio-frequency power to the electrodes constituting the ion guide and the mass separation unit, and the output of the radio-frequency power supplied to these electrodes is about several watts. Therefore, in the ion analysis device described in Patent Literature 1, it is necessary to additionally include a high-output radio-frequency power source in order to generate radicals. Since a high-output radio-frequency power source of several tens of watts or more is expensive, there is a problem that the ion analysis device becomes expensive if such a radio-frequency power source is additionally provided.

An object of the present invention is to provide an ion analysis device capable of generating oxygen radicals and nitrogen radicals for dissociating precursor ions at lower cost than before.

Solution to Problem

According to the present invention made to solve the above problems, an ion analysis device configured to generate and analyze product ions from precursor ions derived from a sample component includes:
  a reaction chamber into which the precursor ions are introduced;
  a radical emitter made of a predetermined kind of metal and disposed in the reaction chamber or a space communicating with the reaction chamber, at least a part of a surface of the radical emitter being oxidized or nitrided;
  a heating unit configured to heat the radical emitter to a predetermined temperature; and
  a separation detection unit configured to separate and detect, according to at least one of a mass-to-charge ratio and an ion mobility, product ions generated from the precursor ions by a reaction with radicals emitted from the radical emitter heated to the predetermined temperature.

Advantageous Effects of Invention

The ion analysis device according to the present invention generates oxygen radicals or nitrogen radicals by heating a radical emitter made of a predetermined kind of metal and having at least a part of the surface oxidized or nitrided to a predetermined temperature. The radical emitter can be, for example, a platinum filament whose surface is coated with platinum oxide, in which case it is heated to about 200° C. by supplying several W of direct current (DC) power to generate oxygen radicals. That is, the predetermined temperature is a temperature at which oxygen radicals is released from the radical emitter, and the temperature is determined based on conventional knowledge, preliminary experiments, or the like. Since the radical emitter is disposed in the reaction chamber or a space communicating with the reaction chamber, radicals are supplied into the reaction chamber, and product ions are generated from precursor ions by reaction with the radicals. The generated product ions are separated and detected by the separation detection unit according to at least one of the mass-to-charge ratio and the ion mobility. Since the ion analysis device according to the present invention does not require a power source that supplies high-output radio-frequency power as in the conventional ion analysis device, the precursor ions derived from sample molecules can be irradiated with oxygen radicals or nitrogen radicals at low cost.

DESCRIPTION OF EMBODIMENTS

One embodiment of an Ion analysis device according to the present invention will be described below with reference to the drawings. The ion analysis device of the present embodiment is a mass spectrometer 1 that separates and detects product ions generated by dissociating precursor ions derived from sample molecules according to the mass-to-charge ratio.

Figure 1:
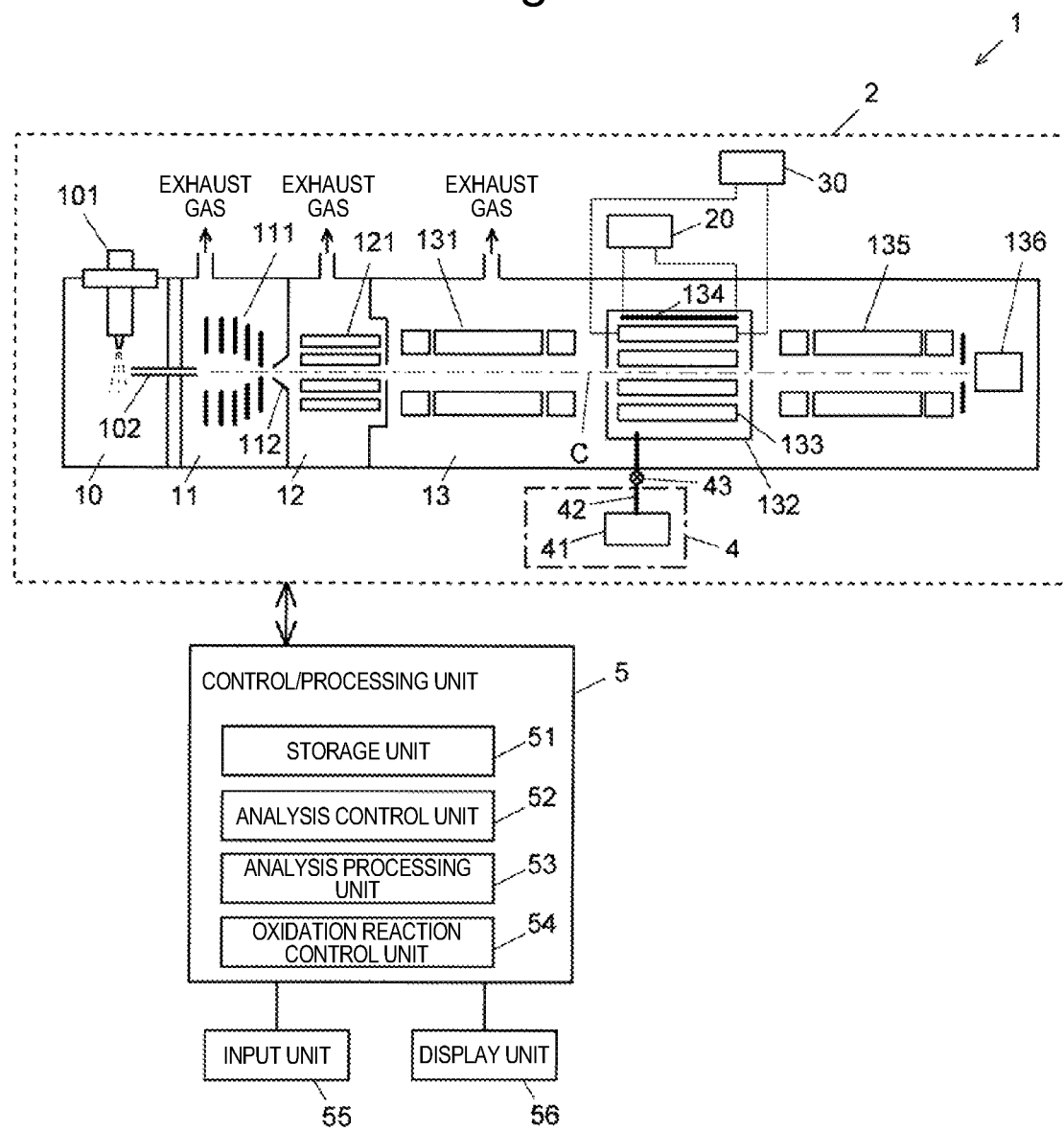
FIG. 1 is a configuration diagram of a main part of a mass spectrometer as an embodiment of an ion analysis device according to the present invention.

FIG. 1 is a schematic configuration diagram of the mass spectrometer 1 of the present embodiment. The mass spectrometer 1 roughly includes a mass spectrometer body 2 and a control/processing unit 5.

The mass spectrometer body 2 is a so-called triple quadrupole mass spectrometer. The mass spectrometer body 2 has a configuration of a multi-stage differential exhaust system including a first intermediate vacuum chamber 11 and a second intermediate vacuum chamber 12 between an ionization chamber 10 at substantially atmospheric pressure and a high-vacuum analysis chamber 13 evacuated by a vacuum pump (not illustrated), in which the degree of vacuum is increased stepwise. The ionization chamber 10 and the first intermediate vacuum chamber 11 communicate with each other via a desolvation tube 102. The first intermediate vacuum chamber 11 and the second intermediate vacuum chamber 12 communicate with each other via a small hole formed at the top of a skimmer 112.

In the ionization chamber 10, for example, an ESI probe 101 is installed. In order to transport the ions to the subsequent stage while converging the ions, an ion lens 111 is disposed in the first intermediate vacuum chamber 11, and an ion guide 121 is disposed in the second intermediate vacuum chamber 12.

In the analysis chamber 13, a front quadrupole mass filter 131, a collision cell 132, a rear quadrupole mass filter 135, and an ion detector 136 are installed. A quadrupole ion guide 133 is disposed inside the collision cell 132, and the filament 134 is disposed at a position closer to the wall surface than the quadrupole ion guide 133. The surface of the quadrupole ion guide 133 of the present embodiment is coated with gold. The filament 134 of the present embodiment is made of platinum whose surface is coated with an oxide (platinum oxide). The surface of the filament 134 can be coated, for example, by placing a platinum filament in oxygen plasma generated by radio-frequency discharge in a vacuum chamber different from the mass spectrometer 1. Although only one filament is illustrated in FIG. 1, a plurality of filaments 134 may be disposed. In any case, it is preferable to dispose the filament 134 at a position away from the central axis (the ion optical axis C) of the flight path of ions (for example, a position outside the internal space of the quadrupole ion guide 133). This makes it possible to prevent ions from being lost due to collision with the filament 134. Here, the quadrupole ion guide 133 whose surface is coated with gold is used, but a quadrupole ion guide coated with platinum can also be used.

Each of the front quadrupole mass filter 131 and the rear quadrupole mass filter 135 includes a pre-rod and a post-rod for adjusting electric fields on a front stage side and a rear stage side of a main rod in addition to the main rod for mass-separating ions by applying an appropriate DC voltage and/or radio-frequency voltage from a power source (not illustrated).

A first DC power source 20 is connected to the filament 134. A second DC power source 30 is connected to the quadrupole ion guide 133. The second DC power source 30 is used for a purpose different from the power source (not illustrated) that applies a DC voltage and/or a radio-frequency voltage for selecting a mass-to-charge ratio of ions to pass through the quadrupole ion guide 133. In the present embodiment, the first DC power source 20 and the second DC power source 30 are provided separately from the power source normally included in the mass spectrometer, but these may be collectively used as one power source having a plurality of output systems. In FIG. 1, only one of the electrodes constituting the quadrupole ion guide 133 is connected to the second DC power source 30, but is actually connected to all the electrodes.

An oxygen gas supply unit 4 is connected to the collision cell 132. The oxygen gas supply unit 4 includes an oxygen gas cylinder 41, an oxygen gas introduction flow path 42 for introducing oxygen gas from the oxygen gas cylinder 41 into the collision cell 132, and a valve 43 for opening and closing the oxygen gas introduction flow path. Although not shown in FIG. 1, the triple quadrupole mass spectrometer usually includes means for introducing a collision gas into the collision cell 132. Therefore, the oxygen gas supply unit 4 of the present embodiment can be configured to supply the oxygen gas to the collision cell 132 through a collision gas introduction flow path.

The control/processing unit 5 has a function of controlling the operation of the mass spectrometer body 2 and storing and analyzing data obtained by the ion detector 136 of the mass spectrometer body 2. The substance of the control/processing unit 5 is a general personal computer, and a method file, a compound database, and the like in which measurement conditions are described are stored in a storage unit 51. The control/processing unit 5 also includes an analysis control unit 52, an analysis processing unit 53, and an oxidation reaction control unit 54 as functional blocks. These functional blocks are embodied by executing a predetermined program installed in the personal computer in advance. Further, an input unit 55 and a display unit 56 are connected to the control/processing unit 5.

Next, the operation of the mass spectrometer 1 of the present embodiment will be described. When the sample component is measured, the operation of each unit is controlled by the analysis control unit 52, and the following measurement operation is performed. The control of the operation of each unit by the analysis control unit 52 is performed according to the analysis condition described in the method file stored in the storage unit 51.

First, the insides of the first intermediate vacuum chamber 11, the second intermediate vacuum chamber 12, and the analysis chamber 13 of the mass spectrometer body 2 each are evacuated to a predetermined degree of vacuum by a vacuum pump. Subsequently, a DC current is supplied from the second DC power source 30 to the quadrupole ion guide 133 to heat the quadrupole ion guide to a predetermined temperature (for example, 100° C.). Further, a DC current is supplied from the first DC power source 20 to the filament 134 to heat the filament to a predetermined temperature (for example, 200° C.). As a result, platinum oxide is decomposed on the surface of the filament 134 to generate oxygen radicals. Although the heating of the quadrupole ion guide 133 is not an essential requirement, in the collision cell 132, it is often necessary to form a highly accurate electric field in order to control the behavior of the ions. Therefore, it is preferable to heat the quadrupole ion guide 133 as described above at the time of measurement to prevent the formation of the oxide on the surface of the electrode. In addition, by coating the surface of the quadrupole ion guide 133 with a noble metal such as gold or platinum as in the present embodiment, formation of an oxide on the surface can be prevented.

Next (or in parallel with the generation of radicals), a sample is introduced into the ESI probe 101 to generate ions. This may be performed by directly injecting a sample into the ESI probe 101, or may be performed by injecting a plurality of kinds of components contained in the sample into a liquid chromatograph and sending an eluate after the components are separated by a column to the ESI probe 101. Ions generated from the sample component in the ionization chamber 10 are drawn into the first intermediate vacuum chamber 11 by a pressure difference between the ionization chamber 10 and the first intermediate vacuum chamber 11, and are converged on the ion optical axis C by the ion lens 111. The ions converged on the ion optical axis C are subsequently drawn into the second intermediate vacuum chamber 12 by a pressure difference between the first intermediate vacuum chamber 11 and the second intermediate vacuum chamber 12, and further converged by the ion guide 121. Thereafter, in the analysis chamber 13, ions having a predetermined mass-to-charge ratio are selected as precursor ions by the front quadrupole mass filter 131, and enter the collision cell 132.

In the collision cell 132, oxygen radicals are attached to precursor ions derived from sample components, unpaired electron-induced dissociation occurs in the precursor ions, and product ions are generated. At this time, since the quadrupole ion guide 133 is heated by the supply of the DC current, oxidation of the surface due to attachment of oxygen radicals is suppressed. The product ions generated by dissociation of precursor ions are emitted from the collision cell 132, subjected to mass separation by the rear quadrupole mass filter 135, and then incident on the ion detector 136 to be detected. Detection signals from the ion detector 136 are sequentially transmitted to the control/processing unit 5 and stored in the storage unit 51.

The analysis processing unit 53 creates a product ion spectrum based on the detection signal and displays the spectrum on the display unit 56. The analysis processing unit 53 estimates the structure of the sample component by performing predetermined data processing based on information (mass information and intensity) obtained from the product ion spectrum. For example, when the sample component is a phospholipid, the structure of the sample component is estimated based on information on a difference between the mass of product ions corresponding to a mass peak appearing in the product ion spectrum (a mass peak having an intensity significantly distinguishable from noise) and the mass of the head group stored in the compound database stored in the storage unit 51.

When the measurement of releasing the oxygen radical from the filament 134 to dissociate the precursor ions derived from the sample component is repeatedly performed, the oxide gradually disappears from the surface of the filament 134, and the oxygen radical is hardly released. Therefore, after the measurement is performed for a predetermined time, the surface of the filament 134 is oxidized under the control of the oxidation reaction control unit 54.

The oxidation reaction control unit 54 supplies oxygen gas from the oxygen gas cylinder 41 of the oxygen gas supply unit 4 into the collision cell 132 via the oxygen gas introduction flow path 42. Subsequently, a DC voltage having a predetermined magnitude is applied from the second DC power source 30 to the quadrupole ion guide 133. The wall surface of the collision cell 132 is often grounded, and DC current discharge occurs between the wall surface and the quadrupole ion guide 133. As a result, oxygen radicals are generated from the oxygen gas in the collision cell 132. The generated oxygen radicals are attached to the surface of the filament 134 and form an oxide on the surface. In this way, the surface of the filament 134 is supplemented with the oxide at the time of measurement.

As described above, in the mass spectrometer 1 of the present embodiment, oxygen radicals are generated by heating the filament 134 whose surface is made of platinum oxide to a predetermined temperature. Since the filament 134 is disposed in the collision cell 132, radicals are supplied into the collision cell 132, and product ions are generated from precursor ions by reaction with the radicals. In the mass spectrometer 1 of the present embodiment, it is not necessary to use a power source that supplies high-output (for example, several tens of watts) radio-frequency power as in the conventional ion analysis device, and low-output (for example, several watts) radio-frequency power is sufficient. Therefore, oxygen radicals can be generated using a small power source at low cost. In addition, since oxygen radicals are generated in the collision cell 132 into which the precursor ions are introduced, it is not necessary to transport the oxygen radicals, and the generated oxygen radicals can be efficiently used for the dissociation reaction of the precursor ions. In addition, in the mass spectrometer 1 of the present embodiment, oxygen radicals can be repeatedly generated from the filament 134 by generating oxygen radicals from the oxygen gas and attaching the oxygen radicals to the filament 134 at the time of non-measurement.

In the above embodiment, oxygen radicals are generated from oxygen gas by generating DC current discharge in the collision cell 132, but oxygen radicals may be generated by radio-frequency discharge instead of DC current discharge. Alternatively, when the measurement is not performed for a long time, the surface of the filament 134 may be gradually oxidized without causing discharge only by supplying oxygen gas into the collision cell 132.

The above-described embodiment is merely examples, and can be appropriately modified in accordance with the spirit of the present invention. In the above embodiment, oxygen radicals are generated from oxygen gas in the collision cell 132 at the time of non-measurement to oxidize the surface of the filament 134, but oxygen radicals can be supplied from the outside of the collision cell 132.

Figure 2:
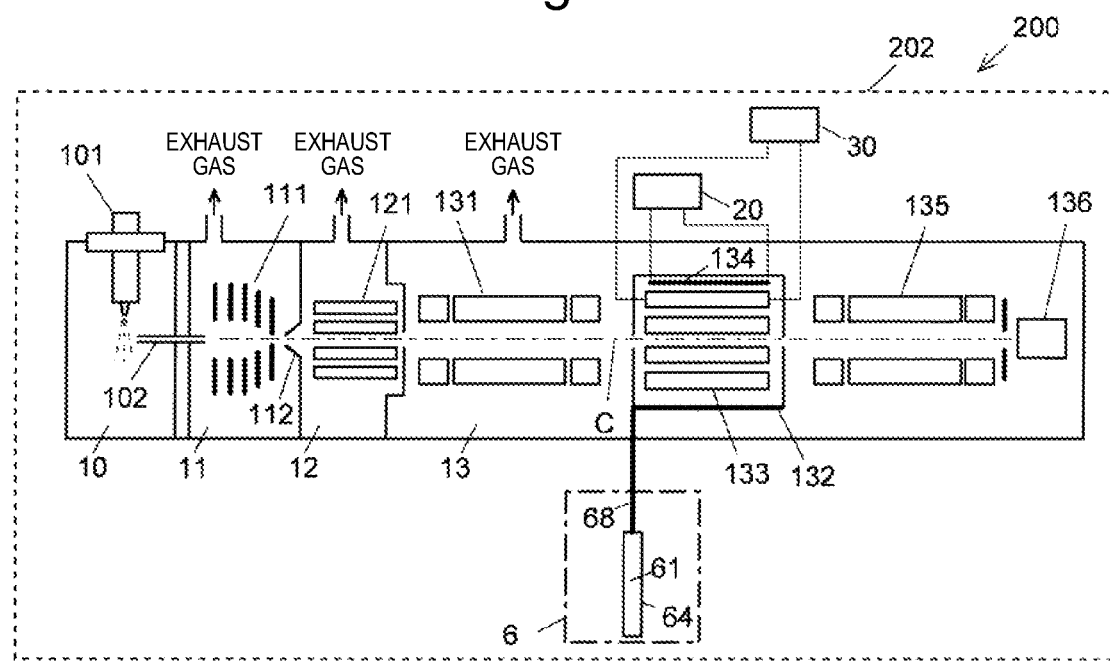
FIG. 2 is a configuration diagram of a main part of a main body of a mass spectrometer of a first modification of the ion analysis device according to the present invention.

FIG. 2 is a configuration diagram of a main part of a mass spectrometer body 202 of a mass spectrometer 200 of a first modification that supplies oxygen radicals from the outside of the collision cell 132. The same components as those in the above embodiment are denoted by the same reference numerals, and the description thereof will be omitted.

Figure 3:
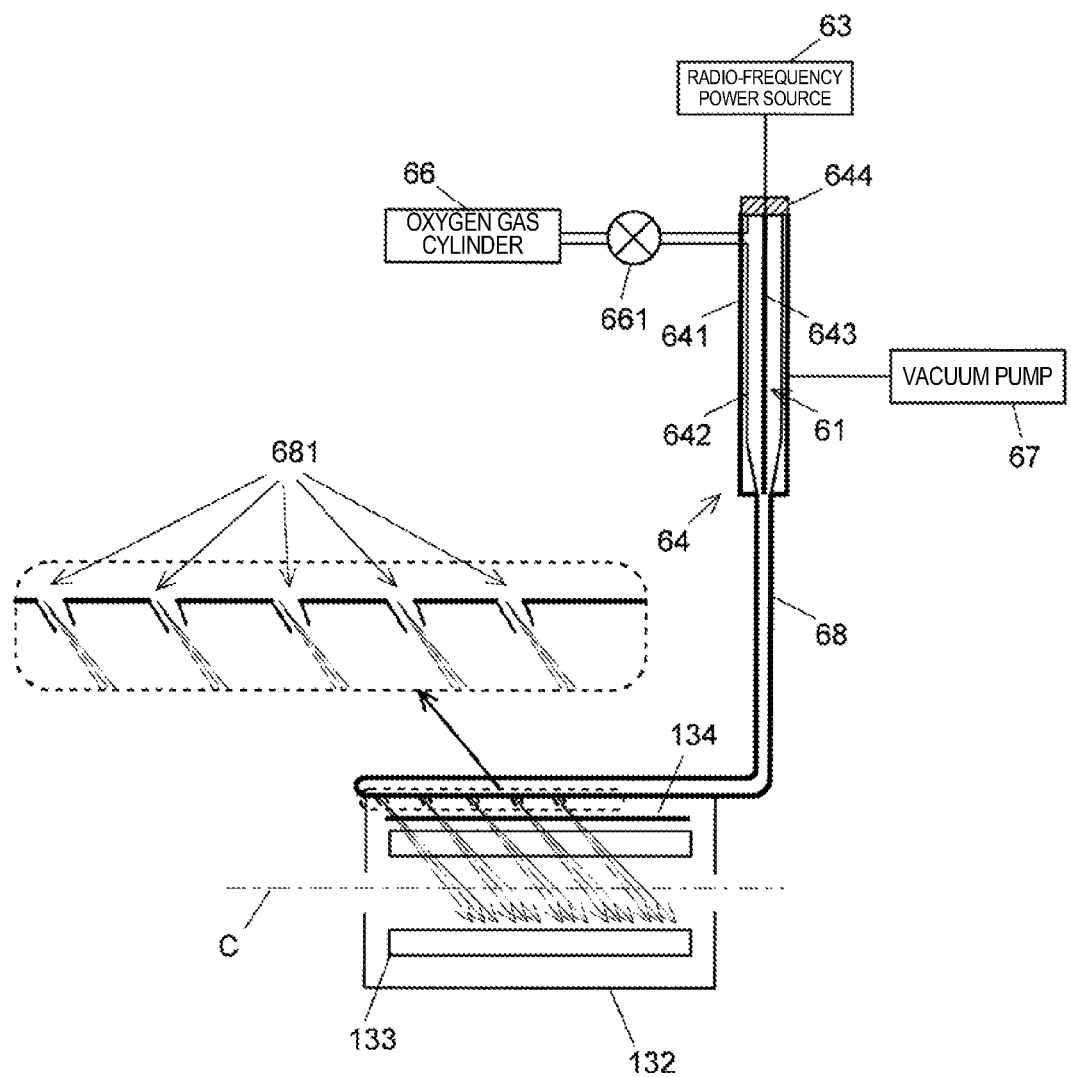
FIG. 3 is a configuration diagram of a main part of an oxygen radical generation/irradiation unit used in the mass spectrometer of the first modification.

The mass spectrometer 200 of the first modification is characterized in that it includes an oxygen radical generation/irradiation unit 6. FIG. 3 illustrates a schematic configuration of the oxygen radical generation/irradiation unit 6.

The oxygen radical generation/irradiation unit 6 includes a nozzle 64 in which a radical generation chamber 61 is formed, a vacuum pump 67 that exhausts the radical generation chamber 61, a radio-frequency power source 63 that supplies microwaves for generating vacuum discharge in the radical generation chamber 61, an oxygen gas cylinder 66 that supplies oxygen gas into the radical generation chamber 61, and a valve 661 that opens and closes a flow path thereof.

The nozzle 64 includes a ground electrode 641 constituting an outer peripheral portion and a torch 642 located inside the ground electrode, and the inside of the torch 642 serves as the radical generation chamber 61. As the torch 642, for example, one made of Pyrex (registered trademark) glass can be used. In the radical generation chamber 61, a needle electrode 643 connected to the radio-frequency power source 63 via a connector 644 penetrates in the longitudinal direction of the radical generation chamber 61.

A transport pipe 68 for transporting radicals generated in the radical generation chamber 61 to the collision cell 132 is connected to an outlet end of the nozzle 64. The transport pipe 68 is an insulating pipe, and for example, a pipe made of quartz can be used.

In the transport pipe 68, a plurality of head units 681 are provided in a portion disposed along a wall surface located in the vicinity of the filament 134 in the collision cell 132. Each head unit 681 is provided with an inclined cone-shaped irradiation port, and is irradiated with radicals in a direction intersecting the central axis (ion optical axis C) of a flight direction of ions. Thus, the entire filament 134 can be uniformly irradiated with oxygen radicals.

In the mass spectrometer 200 of the first modification, oxygen radicals are generated by radio-frequency discharge as in the mass spectrometer described in Patent Literature 1. However, in the mass spectrometer 200 of the first modification, it is sufficient to generate oxygen radicals for oxidizing the surface of the filament 134, and it is not necessary to generate a large amount of oxygen radicals in a short time (for example, 10 ms) as in the case of generating oxygen radicals for dissociating precursor ions. Therefore, a radio-frequency power source having a lower output than the mass spectrometer of Patent Literature 1 may be used, and the cost can be reduced. A mass spectrometer usually includes a radio-frequency power source for applying a radio-frequency voltage to an electrode for ion convergence and selection. In the mass spectrometer 200 of the first modification, such a radio-frequency power source can also be used for generation of oxygen radicals (also used as the radio-frequency power source 63). In addition, oxygen radicals may be generated by DC current discharge instead of radio-frequency discharge, and in that case, a more inexpensive DC current power source can be used.

In the above embodiment and the first modification, the example in which the filament 134 is disposed in the collision cell 132 and oxygen radicals are generated in the collision cell 132 has been described, but a configuration in which oxygen radicals are released from the filament 134 outside the collision cell 132 can also be adopted.

Figure 4:
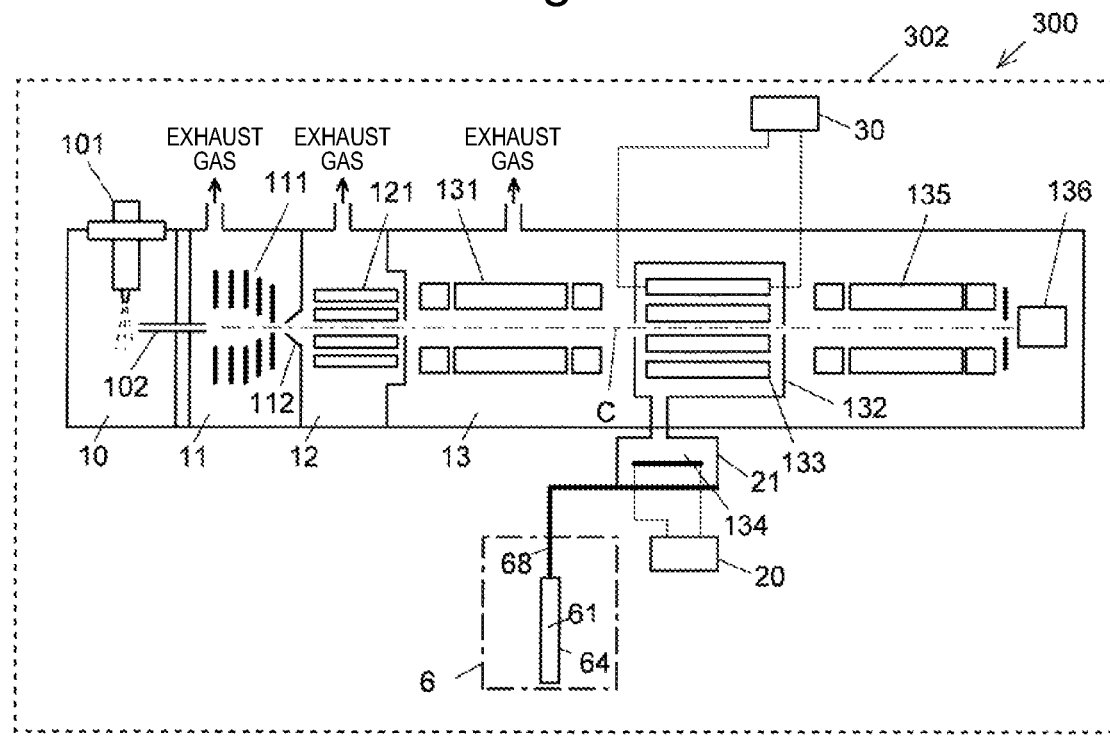
FIG. 4 is a configuration diagram of a main part of a main body of a mass spectrometer of a second modification of the ion analysis device according to the present invention.

FIG. 4 is a configuration diagram of a main part of a mass spectrometer body 302 of a mass spectrometer 300 of a second modification in which oxygen radicals are generated outside the collision cell 132, introduced into the collision cell 132, and attached to precursor ions. The same components as those in the above embodiment and the first modification are denoted by the same reference numerals, and the description thereof will be omitted.

The mass spectrometer 300 of the second modification is characterized in that an oxygen radical generation chamber 21 communicating with the collision cell 132 is provided, and the filament 134 is disposed in the oxygen radical generation chamber 21. Also in the mass spectrometer 300 of the second modification, similarly to the above embodiment and the first modification, oxygen radicals are generated by supplying an electric current of a predetermined magnitude from the first DC power source 20 to the filament 134 and heating the filament to a predetermined temperature. The oxygen radicals generated in the oxygen radical generation chamber 21 flow into the collision cell 132 communicating with the oxygen radical generation chamber 21, and are attached to precursor ions derived from the sample component to generate product ions.

In the mass spectrometer 300 of the second modification, since the oxygen radical generation chamber 21 only needs to be able to accommodate the filament 134, the small oxygen radical generation chamber 21 can be disposed in the vicinity of the collision cell 132 and integrally configured in the main body 302 of the mass spectrometer 300. By disposing the oxygen radical generation chamber 21 adjacent to the collision cell 132, the movement distance of the oxygen radicals can be shortened to reduce the disappearance the oxygen radicals, and the utilization efficiency of the generated oxygen radicals can be increased.

In the mass spectrometer 300 of the second modification, since the filament 134 is disposed outside the collision cell 132, even if undesired impurities are released from the filament 134, the impurities are less likely to flow into the collision cell 132, and the wall surface of the collision cell 132 and the quadrupole ion guide 133 are less likely to be contaminated by impurities. In addition, since oxygen radicals are generated outside the collision cell 132, even if a ribbon wire or a porous metal (both of which have surfaces coated with an oxide) having a volume larger than that of the filament 134 is used, there is no concern that ions collide with the ribbon wire or the porous metal and disappear. In FIG. 4, the oxygen radical generation/irradiation unit 6 is used to form an oxide on the surface of the filament 134 at the time of non-measurement as in the first modification, but the oxygen gas supply unit 4 can also be used as in the above embodiment. In this case, an electrode for generating a discharge in the oxygen radical generation chamber 21 and an electrode for applying a predetermined voltage to the electrode may be provided as necessary.

In each of the above embodiment and modification, the triple quadrupole mass spectrometer is used, but the present invention can also be applied to mass spectrometers having other configurations. One such mass spectrometer is an ion trap-time-of-flight mass spectrometer. Since the ion trap usually has a larger internal space than the collision cell 132 of the mass spectrometer 1 of the above embodiment or the mass spectrometer 200 of the modification, a ribbon wire having a larger volume and surface area than those of the filament 134 of the above embodiment or modification can be used. When the ion trap-time-of-flight mass spectrometer is used, the surface of the filament or ribbon wire may be oxidized by supplying oxygen gas into the ion trap as in the above embodiment, or the surface of the filament or ribbon wire may be oxidized by supplying oxygen radicals generated outside the ion trap to the ion trap as in the above modification.

In the above embodiment and modification, platinum whose surface is coated with an oxide is used as the filament 134, but a material made of a metal other than platinum can also be used. As described in Non Patent Literature 1, for example, tungsten or copper can also be used. Also in the case of using these compounds, similarly to the above embodiment, the temperature at which oxygen radicals are released from these oxides may be determined by a preliminary experiment or the like, and the temperature may be set to a predetermined temperature. However, when a noble metal is used, undesirable impurities other than oxygen radicals are less likely to be released, and the surface or the like of the quadrupole ion guide 133 in the collision cell 132 is less likely to be contaminated. Therefore, it is preferable to use a filament or the like made of a noble metal such as platinum as in the above embodiment.

Further, in the above embodiment and modification, the configuration in which oxygen radicals are released from the metal oxide has been described, but a configuration in which nitrogen radicals are released from the metal nitride can also be adopted. For example, by disposing a filament or ribbon wire made of platinum whose surface is coated with platinum nitride inside a collision cell or an ion trap and heating the filament or ribbon wire to a predetermined temperature, nitrogen radicals can be attached to precursor ions in the collision cell or the ion trap to generate product ions. In this case, a nitrogen gas cylinder may be used instead of the oxygen gas cylinder 41 used in the above embodiment, or a nitrogen radical generation/irradiation unit may be used instead of the oxygen radical generation/irradiation unit 6 used in the above modification.

In addition, in the above embodiment, the ESI probe 101 that ionizes the liquid sample is used as an ionization source, but an ionization source according to the form and characteristics of the sample to be measured may be used. For example, an electron ionization source can be used when the sample is a gas, and a matrix-assisted laser desorption/ionization source (MALDI source) can be used when the sample is a biological sample. Further, both the above embodiment and modification have described mass spectrometers that separate and measure ions according to the mass-to-charge ratio, but the present invention can also be applied to an ion analysis device of an ion mobility analyzer that separates and measures ions according to mobility.

Next, a result of measurement performed using the mass spectrometer 1 of the above embodiment will be described.

Figure 5:
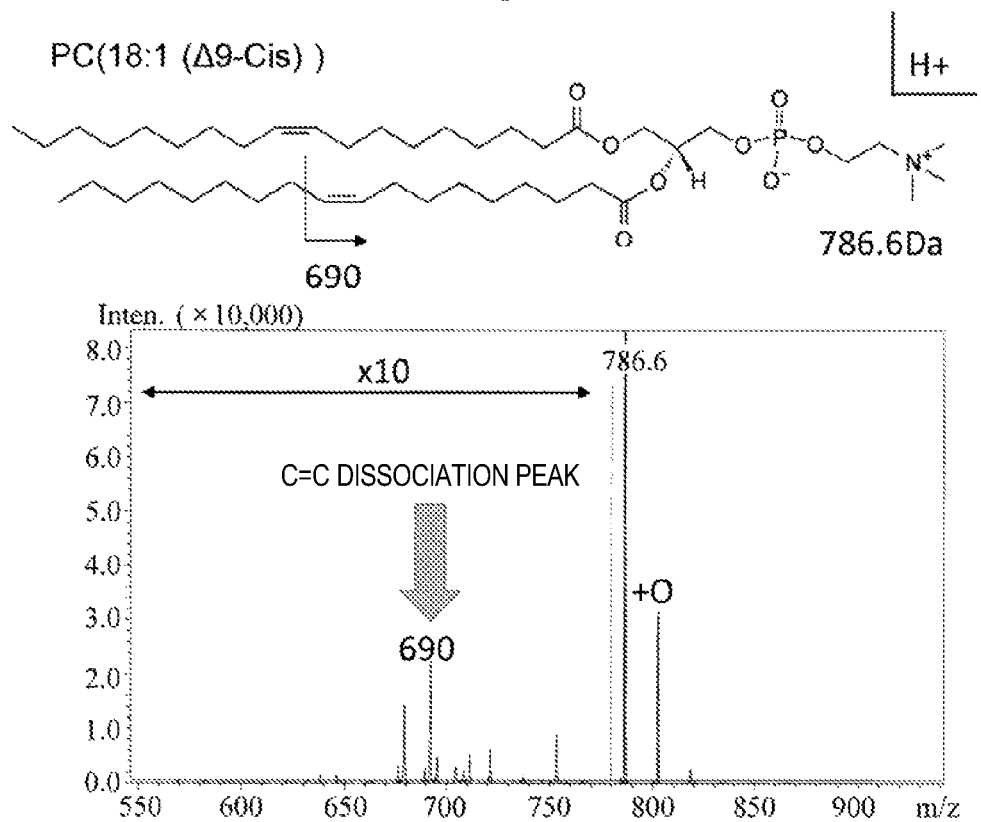
FIG. 5 shows a product ion spectrum obtained by measuring phospholipids using the mass spectrometer of a first embodiment.

FIG. 5 illustrates a mass spectrum (product ion spectrum) obtained by measuring product ions generated by dissociating precursor ions derived from the phospholipid PC 18:1 (9Z). In this measurement, a platinum wire (filament) having a diameter of 0.1 and a length of 50 mm, the surface of which had been subjected to oxidation treatment in advance, was placed in the collision cell 132, and an electric current of 0.6 A was passed through the platinum wire to heat the platinum wire to about 1000° C. to release atomic radicals (atomic oxygen). In this measurement, oxidation treatment of the surface was performed by placing a platinum filament in oxygen plasma generated by radio-frequency discharge in a vacuum chamber different from the mass spectrometer 1 for 1 hour. Of course, the oxidation treatment of the surface is not limited to this method, and for example, it is also possible to oxidize the surface in a liquid phase so as to be used in the production of the Adam's catalyst.

In the product ion spectrum illustrated in FIG. 5, a mass peak with a mass-to-charge ratio of 690 appears. This is a mass peak of product ions generated by dissociation of molecular ions (precursor ions) of the phospholipid PC 18:1 (9Z) at the position of an unsaturated carbon-carbon bond. As described in Patent Literature 2, an oxygen radical specifically dissociates a hydrocarbon chain at the position of an unsaturated carbon-carbon bond. That is, it can be seen that also in the mass spectrometer 1 of the present embodiment, similarly to Patent Literature 2, oxygen radicals are attached to precursor ions to generate product ions, and an oxygen attachment dissociation (OAD) spectrum is obtained.

In addition, when the above measurement was repeated while the release of oxygen radicals from the platinum filament was continued, the OAD spectrum was continuously obtained from one φ0.1 platinum wire for about 1 hour. The larger the surface area of the radical emitter that releases oxygen radicals, the faster and more oxygen radicals can be released. In this respect, for example, it is preferable to use the ribbon wire described in the above modification. In addition, the surface area can be increased by using a porous metal. For example, if eight ribbon wires having a width of 6 mm are installed in a collision cell, it is considered that MS/MS measurement for about 500 hours can be performed. As an example, assuming that one LC analysis is about 20 minutes, 1500 times of LC-MS/MS analysis can be continuously performed by using such a ribbon wire.

Modes

It is understood by those skilled in the art that the plurality of exemplary embodiments described above are specific examples of the following modes.

Clause 1

An analysis device according to one mode is an ion analysis device configured to generate and analyze product ions from precursor ions derived from a sample component, the ion analysis device including:
- a reaction chamber into which the precursor ions are introduced;
- a radical emitter made of a predetermined kind of metal and disposed in the reaction chamber or a space communicating with the reaction chamber, at least a part of a surface of the radical emitter being oxidized or nitrided;
- a heating unit configured to heat the radical emitter to a predetermined temperature; and
- a separation detection unit configured to separate and detect, according to at least one of a mass-to-charge ratio and an ion mobility, product ions generated from the precursor ions by a reaction with radicals emitted from the radical emitter heated to the predetermined temperature.

The ion analysis device according to Clause 1 generates oxygen radicals or nitrogen radicals by heating a radical emitter made of a predetermined kind of metal and having at least a part of the surface oxidized or nitrided to a predetermined temperature. The radical emitter can be, for example, a platinum filament whose surface is coated with platinum oxide, in which case it is heated to about 200° C. by supplying several W of direct current (DC) power to generate oxygen radicals. That is, the predetermined temperature is a temperature at which oxygen radicals is released from the radical emitter, and the temperature is determined based on conventional knowledge, preliminary experiments, or the like. Since the radical emitter is disposed in the reaction chamber or a space communicating with the reaction chamber, radicals are supplied into the reaction chamber, and product ions are generated from precursor ions by reaction with the radicals. The generated product ions are separated and detected by the separation detection unit according to at least one of the mass-to-charge ratio and the ion mobility. Since the ion analysis device according to Clause 1 does not require a power source that supplies high-output radio-frequency power as in the conventional ion analysis device, the sample molecules can be irradiated with oxygen radicals or nitrogen radicals at low cost.

Clause 2

The ion analysis device according to Clause 1, wherein the radical emitter is platinum having at least a part of a surface thereof oxidized.

When a metal that is easily oxidized is heated, unexpected impurities may be released and the inside of the reaction chamber may be contaminated. In the ion analysis device according to Clause 2, platinum which is a noble metal is used as a metal constituting the radical emitter, so that impurities other than oxygen radicals are hardly released from the radical emitter, and the possibility that the reaction chamber is contaminated can be reduced.

Clause 3

The ion analysis device according to Clause 1 or 2, wherein
the radical emitter is formed in a ribbon wire.

Clause 4

The ion analysis device according to Clause 1 or 2, wherein
the radical emitter is formed in a filament.

Since the radical emitter releases oxygen radicals or nitrogen radicals from the oxide or nitride formed on the surface thereof, the radical generation efficiency can be enhanced by increasing the surface area. In the ion analysis device according to Clause 3 or 4, since the ribbon wire or the filament which is a linear body is used as a radical emitter, the surface area of the radical emitter is large, and radicals are efficiently emitted. In particular, in the ion analysis device according to Clause 4, by using a filament having a small volume, the possibility that precursor ions and product ions collide with the radical emitter and disappear can also be reduced.

Clause 5

The ion analysis device according to any one of Clauses 1 to 4, further including:
an electrode disposed in the reaction chamber, and configured to control behavior of ions in the reaction chamber; and
a second heating unit configured to heat the electrode to a predetermined temperature.

The reaction chamber is often a three-dimensional ion trap or a linear ion trap (collision cell), which has electrodes for trapping and selecting ions. When a part of oxygen radicals or nitrogen radicals emitted from the radical emitter attach to these electrodes, disturbance occurs in an electric field formed by applying a DC voltage and/or a radio-frequency voltage to these electrodes, and there is a possibility that the behavior of ions cannot be correctly controlled. In the ion analysis device according to Clause 5, by heating such an electrode to a predetermined temperature, it is possible to suppress oxidation or nitriding of the electrode surface and to reduce the possibility that disturbance occurs in the electric field formed by these electrodes.

Clause 6

The ion analysis device according to Clause 5, wherein the surface of the electrode is gold or platinum.

In the ion analysis device according to Clause 6, the possibility of oxidation or nitriding can be further reduced by using an electrode whose surface is gold or platinum.

Clause 7

The ion analysis device according to any one of Clauses 1 to 6, further including:
an oxidation reactant supply unit configured to supply an oxidation reactant that oxidizes a surface of the radical emitter to a space in which the radical emitter is disposed.

The oxygen radical is released from the surface of the radical emitter, and at the same time, the oxide also disappears. In the ion analysis device according to Clause 7, the surface of the radical emitter is oxidized by the oxidation reactant, so that oxygen radicals can be repeatedly released.

Clause 8

The ion analysis device according to Clause 7, wherein the oxidation reactant supply unit includes an oxygen gas supply unit configured to supply oxygen gas to a space in which the radical emitter is disposed.

In the ion analysis device according to Clause 8, oxygen gas is supplied to a space in which the radical emitter is disposed (a reaction chamber or a space communicating with the reaction chamber), and the surface of the radical emitter can be oxidized by the oxygen gas.

Clause 9

The ion analysis device according to Clause 8, wherein the oxidation reactant supply unit further includes a discharge unit configured to generate DC current discharge or radio-frequency discharge in the space in which the radical emitter is disposed.

In the ion analysis device according to Clause 9, oxygen radicals are generated by generating DC current discharge or radio-frequency discharge in a space in which the radical emitter is disposed (a reaction chamber or a space communicating with the reaction chamber), and the surface of the radical emitter can be efficiently oxidized.

Clause 10

The ion analysis device according to Clause 7, wherein the oxidation reactant supply unit includes:
an oxygen radical generator configured to generate oxygen radicals outside a space in which the radical emitter is disposed; and
an oxygen radical introduction unit configured to introduce oxygen radicals generated in the oxygen radical generator into a space in which the radical emitter is disposed.

In the ion analysis device described in Clause 10, oxygen radicals generated outside a space (a reaction chamber or a space communicating with the reaction chamber) in which the radical emitter is disposed are introduced into the space, whereby the surface of the radical emitter can be oxidized. In addition, in the radical generation unit which generates oxygen radicals for dissociating precursor ions, it is necessary to generate a large amount of oxygen radicals in a short time, and thus it is necessary to generate discharge using high output radio-frequency power. However, when the surface of the radical emitter is oxidized, it is not necessary to generate such a large amount of oxygen radicals. Therefore, it is only required to generate radicals by generating discharge by supplying DC power or low-output radio-frequency power.

REFERENCE SIGNS LIST 1, 200, 300 . . . Mass Spectrometer
2, 202, 302 . . . Mass Spectrometer Body
10 . . . Ionization Chamber
101 . . . ESI Probe
102 . . . Desolvation Tube
11 . . . First Intermediate Vacuum Chamber
111 . . . Ion Lens
112 . . . Skimmer
12 . . . Second Intermediate Vacuum Chamber
121 . . . Ion Guide
13 . . . Analysis Chamber
131 . . . Front Quadrupole Mass Filter
132 . . . Collision Cell
133 . . . Quadrupole Ion Guide
134 . . . Filament
135 . . . Rear Quadrupole Mass Filter
136 . . . Ion Detector
20 . . . First DC Power Source
21 . . . Oxygen Radical Generation Chamber
30 . . . Second DC Power Source
4 . . . Oxygen Gas Supply Unit
41 . . . Oxygen Gas Cylinder
42 . . . Oxygen Gas Introduction Flow Path
43 . . . Valve
5 . . . Control/Processing Unit
51 . . . Storage Unit
52 . . . Analysis Control Unit
53 . . . Analysis Processing Unit
54 . . . Oxidation Reaction Control Unit
55 . . . Input Unit
56 . . . Display Unit
6 . . . Oxygen Radical Generation/Irradiation Unit
61 . . . Radical Generation Chamber
63 . . . Radio-Frequency Power Source
64 . . . Nozzle
641 . . . Ground Electrode
642 . . . Torch
643 . . . Needle Electrode
644 . . . Connector
66 . . . Oxygen Gas Cylinder
661 . . . Valve
67 . . . Vacuum Pump
68 . . . Transport Pipe
681 . . . Head Unit

The invention claimed is:

1. An ion analysis device configured to generate and analyze product ions from precursor ions derived from a sample component, the ion analysis device comprising:
a reaction chamber into which the precursor ions are introduced;
a radical emitter made of a predetermined kind of metal and disposed in the reaction chamber or a space communicating with the reaction chamber, at least a part of a surface of the radical emitter being oxidized or nitrided;
a heating unit configured to heat the radical emitter to a predetermined temperature; and
a separation detection unit configured to separate and detect, according to at least one of a mass-to-charge ratio and an ion mobility, product ions generated from the precursor ions by a reaction with radicals emitted from the radical emitter heated to the predetermined temperature.

2. The ion analysis device according to claim 1, wherein the radical emitter is platinum having at least a part of a surface thereof oxidized.

3. The ion analysis device according to claim 1, wherein the radical emitter is formed in a ribbon wire.

4. The ion analysis device according to claim 1, wherein the radical emitter is formed in a filament.

5. The ion analysis device according to claim 1, further comprising:
an electrode disposed in the reaction chamber, and configured to control behavior of ions in the reaction chamber; and
a second heating unit configured to heat the electrode to a predetermined temperature.

6. The ion analysis device according to claim 5, wherein a surface of the electrode is gold or platinum.

7. The ion analysis device according to claim 1, further comprising:
an oxidation reactant supply unit configured to supply an oxidation reactant that oxidizes a surface of the radical emitter to a space in which the radical emitter is disposed.

8. The ion analysis device according to claim 7, wherein the oxidation reactant supply unit includes an oxygen gas supply unit configured to supply oxygen gas to a space in which the radical emitter is disposed.

9. The ion analysis device according to claim 8, wherein the oxidation reactant supply unit further includes a discharge unit configured to generate DC current discharge or radio-frequency discharge in the space in which the radical emitter is disposed.

10. The ion analysis device according to claim 7, wherein the oxidation reactant supply unit includes:
an oxygen radical generator configured to generate oxygen radicals outside a space in which the radical emitter is disposed; and
an oxygen radical introduction unit configured to introduce oxygen radicals generated in the oxygen radical generator into a space in which the radical emitter is disposed.

* * * * *